United States Patent
Ogasawara et al.

(10) Patent No.: US 9,029,462 B2
(45) Date of Patent: May 12, 2015

(54) ADHESIVE COMPOSITION, ADHESION METHOD USING THE SAME, LAMINATE AND TIRE

(75) Inventors: Takuya Ogasawara, Fuchu (JP); Ryuji Nakagawa, Kodaira (JP); Kotaro Hayakawa, Edogawa-ku (JP); Hideyuki Chiashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/111,206

(22) PCT Filed: Apr. 12, 2012

(86) PCT No.: PCT/JP2012/002558
§ 371 (c)(1),
(2), (4) Date: Oct. 11, 2013

(87) PCT Pub. No.: WO2012/140902
PCT Pub. Date: Oct. 18, 2012

(65) Prior Publication Data
US 2014/0048194 A1 Feb. 20, 2014

(30) Foreign Application Priority Data

Apr. 15, 2011 (JP) ................................. 2011-090545

(51) Int. Cl.
*C08L 19/00* (2006.01)
*B60C 1/00* (2006.01)
*B32B 27/38* (2006.01)
(Continued)

(52) U.S. Cl.
CPC ............... *C08L 19/006* (2013.01); *B29D 30/58* (2013.01); *B29D 2030/544* (2013.01); *B29D 2030/582* (2013.01); *B60C 5/14* (2013.01); *C08G 59/34* (2013.01); *C09J 163/08* (2013.01); *B32B 25/04* (2013.01); *B32B 25/08* (2013.01); *B32B 27/306* (2013.01); *B32B 27/32* (2013.01); *B32B 27/34* (2013.01); *B32B 27/40* (2013.01); *B32B 2605/08* (2013.01); *C08C 19/06* (2013.01); *C08L 7/00* (2013.01); *C08L 15/00* (2013.01); *C08L 2205/02* (2013.01); *B60C 1/00* (2013.01); *B60C 1/0008* (2013.04); *B29D 2030/0682* (2013.01)

(58) Field of Classification Search
USPC ............. 524/502; 152/565; 525/333.1, 332.5; 156/307.1; 428/414
See application file for complete search history.

(56) References Cited

U.S. PATENT DOCUMENTS

2008/0314491 A1  12/2008  Soeda et al.

FOREIGN PATENT DOCUMENTS

CN    101351331 A    1/2009
EP    1700882 A1    9/2006
(Continued)

OTHER PUBLICATIONS

Extended European Search Report issued Aug. 21, 2014 in corresponding European Patent Application No. 12771198.4.
(Continued)

*Primary Examiner* — Ling Choi
*Assistant Examiner* — Ronald Grinsted
(74) *Attorney, Agent, or Firm* — Sughrue Mion, PLLC

(57) ABSTRACT

The present invention provides an adhesive composition that may improve both adhesiveness to a film layer and adhesiveness to a rubber layer, and an adhesion method using the same, as well as a laminate and a tire. The adhesive composition according to the present invention includes a rubber component, at least 80 mass % of which rubber component is an epoxidized natural rubber.

11 Claims, 1 Drawing Sheet

(51) Int. Cl.

| | | |
|---|---|---|
| *C08C 19/06* | (2006.01) | |
| *B32B 37/00* | (2006.01) | |
| *B29D 30/58* | (2006.01) | |
| *B60C 5/14* | (2006.01) | |
| *C08G 59/34* | (2006.01) | |
| *C09J 163/08* | (2006.01) | |
| *B32B 25/04* | (2006.01) | |
| *B32B 25/08* | (2006.01) | |
| *B32B 27/30* | (2006.01) | |
| *B32B 27/32* | (2006.01) | |
| *B32B 27/34* | (2006.01) | |
| *B32B 27/40* | (2006.01) | |
| *C08L 7/00* | (2006.01) | |
| *C08L 15/00* | (2006.01) | |
| *B29D 30/54* | (2006.01) | |
| *B29D 30/06* | (2006.01) | |

(56) References Cited

FOREIGN PATENT DOCUMENTS

| EP | 2420545 A1 | 2/2012 |
|---|---|---|
| GB | 2223019 A * | 3/1990 |
| JP | 64-043586 A | 2/1989 |
| JP | 02-110182 A | 4/1990 |
| JP | 07-082418 A | 3/1995 |
| JP | 2007-098843 A | 4/2007 |
| JP | 2009-528178 A | 8/2009 |
| JP | 2010-006133 A | 1/2010 |
| JP | 2010-215725 A | 9/2010 |
| RU | 2401743 C2 | 10/2010 |
| WO | 2010119685 A1 | 10/2010 |

OTHER PUBLICATIONS

Communication dated Jan. 29, 2015, issued by the Russian Patent Office in corresponding Russian Application No. 2013150830/05.

Communication dated Jan. 27, 2015 from the Japanese Patent Office in corresponding Japanese Application No. 2013-509801.

Office Action issued on Mar. 20, 2015 from the State Intellectual Property Office of P. R. China in corresponding Chinese Application No. 201280018486.0.

* cited by examiner

ADHESIVE COMPOSITION, ADHESION METHOD USING THE SAME, LAMINATE AND TIRE

CROSS REFERENCE TO RELATED APPLICATIONS

This is a National Stage of International Application No. PCT/JP2012/002558, filed Apr. 12, 2012, claiming priority from Japanese Patent Application No. 2011-090545, filed Apr. 15, 2011, the contents of all of which are incorporated herein by reference in their entirety.

TECHNICAL FIELD

The present invention relates to an adhesive composition and an adhesion method using the same, as well as a laminate and a tire, and in particular, to an adhesive composition that may improve both adhesiveness to a film layer and adhesiveness to a rubber layer and an adhesion method using the same, as well as a laminate formed by the method and a tire using the laminate.

BACKGROUND ART

As an inner liner structure of tires, a three-layered structure is known that is formed by a resin film layer (film layer) 10, an adhesive layer 11 and a butyl inner layer (rubber layer) 12 as illustrated in FIG. 1. In this case, a rubber composition that is mainly composed of butyl rubber, halogenated butyl rubber, and so on is used for the butyl inner layer 12, which is disposed on the inner surface of the tire as an air barrier layer to maintain the inner pressure of the tire. In addition, a known technique utilizes a film that is composed of a thermoplastic resin and a thermoplastic elastomer as the resin film layer 10. Moreover, a variety of materials have been considered as candidates for the adhesive layer 11 (see, for example, JP 7-082418 A (PTL 1) and JP 2007-098843 A (PTL 2)).

Since the aforementioned three-layered, inner liner structure involves the resin film layer 10 and the butyl inner layer 12, the resulting tire would have high resistance to air permeability, but may be heavy in weight.

To address such a deficiency, studies have been made to reduce the weight of the tire by removing the butyl inner layer 12 and a squeegee layer 13 (FIG. 2).

In this context, a known technique allows a resin film layer 20 to be adhered to a carcass cord layer 22 by applying a commercially available adhesive, such as METALOCK R-46 (manufactured by Toyo Chemical Co., Ltd.) and Chemlok 6250 (manufactured by LORD Corporation), to the resin film layer 20 or the carcass cord layer 22.

However, an adhesive layer 21 formed by the aforementioned commercially available adhesive has low tackiness due to the reaction of adhesive components in the adhesive layer 21, making it difficult to improve both adhesiveness to the resin film layer 20 and adhesiveness to the carcass cord layer 22. This results in insufficient adhesiveness between the resin film layer 20 and the carcass cord layer 22 and peeling off of the resin film layer 20 from the carcass cord layer 22, interfering with stable production of tires and causing separation of the resin film layer 20 under high-load running conditions.

There is another requirement to use more environment-friendly adhesives without lead, halogen, and so on.

CITATION LIST

Patent Literature

PTL 1: JP 7-082418 A
PTL 2: JP 2007-098843 A

SUMMARY OF INVENTION

Technical Problem

An object of the present invention is to provide an adhesive composition that may improve both adhesiveness to a film layer and adhesiveness to a rubber layer, and an adhesion method using the same, as well as a laminate and a tire.

Another object of the present invention is to provide an adhesive composition that may improve air retention (reduce air permeability), in addition to improving both adhesiveness to a film layer and adhesiveness to a rubber layer, and an adhesion method using the same, as well as a laminate and a tire.

Solution to Problem

The inventors of the present invention have made intensive studies to achieve the aforementioned objects and found that these objects may be accomplished when an adhesive composition contains a rubber component, at least 80 mass % of which rubber component is an epoxidized natural rubber. The present invention has been contrived based on this discovery.

That is, an adhesive composition according to the present invention comprises a rubber component, at least 80 mass % of which rubber component is an epoxidized natural rubber.

The adhesive composition comprises two or more epoxidized natural rubbers having different epoxidation rates.

As used herein, the epoxidation rate means a ratio (in mol %) of the number of epoxidized double bonds to the total number of double bonds in rubber before epoxidation, and can be measured by the following method.

<Method of Measuring Epoxidation Rate>

Each of the prepared epoxidized natural rubber samples (ENR) was dissolved in deuterated chloroform and the epoxidation rate of the sample was calculated by nuclear magnetic resonance (NMR) (JNM-ECA series available from JEOL Ltd.) spectroscopy from a ratio of an integral value h (ppm) of the carbon-carbon double bond portion to an integral value h (ppm) of the aliphatic portion, using the following calculation formula:

$$(\text{epoxidation rate}) = 3 \times h(2.69)/(3 \times h(2.69) + 3 \times h(5.14) + h(0.87)) \times 100$$

It is desirable that the epoxidized natural rubber includes at least an epoxidized natural rubber A and an epoxidized natural rubber B, and that the epoxidized natural rubber A has a higher degree of epoxidation than that of the epoxidized natural rubber B.

It is desirable that the epoxidized natural rubber A has a degree of epoxidation of 40 mol % to 80 mol % and the epoxidized natural rubber B has a degree of epoxidation of 10 mol % to 35 mol %.

It is desirable that the epoxidized natural rubber A is contained in the epoxidized natural rubber by 10 mass % to 80 mass %.

It is desirable that the epoxidized natural rubber B is contained in the epoxidized natural rubber by 20 mass % to 90 mass %.

It is desirable that the epoxidized natural rubber has an average degree of epoxidation of 15 mol % to 70 mol %.

The adhesive composition may further comprise a crosslinking agent, or a crosslinking agent and a crosslinking promoter.

An adhesion method according to the present invention comprises: disposing the aforementioned adhesive composition between a film layer and an unvulcanized rubber layer; and vulcanizing the film layer and the unvulcanized rubber layer.

The film layer may contain at least one selected from a polyamide-based polymer, an ethylene-vinyl alcohol-based copolymer, a urethane-based polymer, an olefin-based polymer, and a diene-based polymer.

An application liquid formed by dissolving the adhesive composition in a good solvent may be applied to the film layer or the unvulcanized rubber layer.

The adhesive composition may also be formed into a sheet and disposed between the film layer and the unvulcanized rubber layer.

A laminate according to the present invention is formed by a film layer and an unvulcanized rubber layer adhered to each other by the adhesion method according to the present invention.

In addition, a tire according to the present invention comprises the laminate of the present invention.

Advantageous Effect of Invention

The present invention may provide an adhesive composition that can improve both adhesiveness to a film layer and adhesiveness to a rubber layer, and an adhesion method using the same, as well as a laminate and a tire. Furthermore, the present invention may provide an adhesive composition that may improve air retention (reduce air permeability), in addition to improving both adhesiveness to a film layer and adhesiveness to a rubber layer, and an adhesion method using the same, as well as a laminate and a tire.

DESCRIPTION OF EMBODIMENTS

Figure 1:
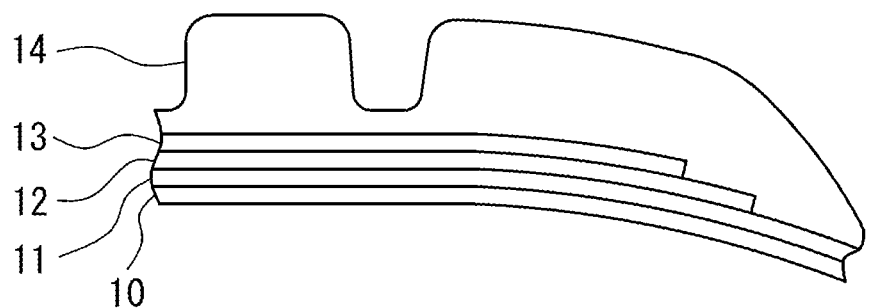
FIG. 1 is a schematic configuration diagram illustrating an example of inner liner structure.
Figure 2:
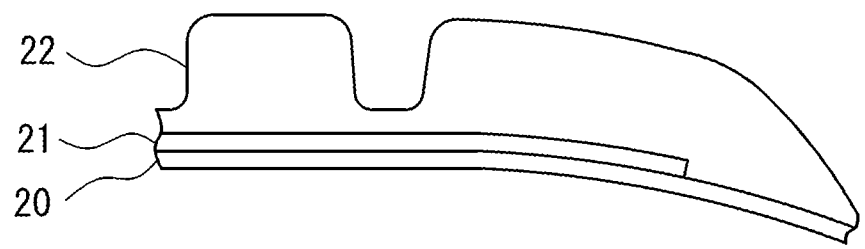
FIG. 2 is a schematic configuration diagram illustrating another example of inner liner structure.

The present invention will now be specifically described below with reference to the accompanying drawings as appropriate.

(Adhesive Composition)
An adhesive composition according to the present invention comprises at least a rubber component and, optionally, a crosslinking agent, a crosslinking promoter and other components.

<Rubber Components>
The rubber component contains at least an epoxidized natural rubber and, optionally, other optional components.
—Epoxidized Natural Rubber—
As used herein, the epoxidized natural rubber means a product that is produced by introducing an epoxy group into a double bond portion in a natural rubber molecule.

The content of the epoxidized natural rubber in the rubber component may be selected appropriately depending on the intended use without any particular limitation, as long as it is not less than 80 mass %. This content is preferably more than 90 mass %, more preferably more than 95 mass %, and particularly preferably 100 mass %.

If the content of the epoxidized natural rubber is less than 80 mass %, it is not possible to improve both adhesiveness to the film layer and adhesiveness to the rubber layer. In contrast, if the content of the epoxidized natural rubber is within the particularly preferable range, this is advantageous in terms of operability in molding tires because of improved adhesiveness to the film layer, improved adhesiveness to the rubber layer and enhanced tackiness.

The epoxidized natural rubber preferably includes at least an epoxidized natural rubber A and an epoxidized natural rubber B and, optionally, other optional components.
—Epoxidized Natural Rubber A—
The degree of epoxidation of the epoxidized natural rubber A may be selected appropriately depending on the intended use without any particular limitation, as long as it is higher than that of the epoxidized natural rubber B. This degree of epoxidation of the epoxidized natural rubber A is preferably 40 mol % to 80 mol %, and more preferably 45 mol % to 55 mol %.

If the degree of epoxidation of the epoxidized natural rubber A is less than 40 mol %, adhesiveness to the film layer may be insufficient, while if it is more than 80 mol %, cracks may appear in the adhesion layer when the resulting rubber is used in a low temperature area. In contrast, if the degree of epoxidation of the epoxidized natural rubber A is within the more preferable range, this is advantageous in terms of balancing adhesiveness to the film layer and low-temperature crack resistance.

As used herein, the aforementioned degree of epoxidation represents the molar percentage (mol %) of olefin-unsaturated positions originally present in the rubber which has been converted into oxirane, and may also be referred to as "oxirane enzyme concentration." For example, the degree of epoxidation may be calculated using nuclear magnetic resonance (NMR) (JNM-ECA series available from JEOL Ltd.) spectroscopy, and so forth.

The epoxidized natural rubber (ENR) may be formed by using a commercially available epoxidized natural rubber or epoxidizing a natural rubber.

Methods for epoxidizing a natural rubber are not particularly limited and may be selected appropriately depending on the intended use, including, for example, a chlorohydrin process, a direct oxidation process, a hydrogen peroxide process, an alkyl hydroperoxide process, and a peroxidation process. The peroxidation process includes, for example, a process to allow a natural rubber to react with an organic peracid, such as peracetic acid and performic acid.

The content of the epoxidized natural rubber A in the epoxidized natural rubber may be selected appropriately depending on the intended use without any particular limitation, and is preferably 10 mass % to 80 mass %, more preferably 15 mass % to 40 mass %, and particularly preferably 20 mass % to 30 mass %.

If the content of the epoxidized natural rubber A in the epoxidized natural rubber is less than 10 mass %, adhesiveness to the film layer may be insufficient, while if the content is more than 80 mass %, cracks may occur in the adhesion layer when the rubber is used in a low temperature area. In contrast, if the content of the epoxidized natural rubber A in the epoxidized natural rubber is within the particularly preferable range, this is advantageous in terms of balancing adhesiveness to the film layer and low-temperature crack resistance.
—Epoxidized Natural Rubber B—
The degree of epoxidation of the epoxidized natural rubber B may be selected appropriately depending on the intended use without any particular limitation, as long as it is lower than that of the epoxidized natural rubber A. This degree of epoxidation of the epoxidized natural rubber B is preferably 10 mol % to 35 mol %, and more preferably 20 mol % to 30 mol %. If the degree of epoxidation of the epoxidized natural rubber B is less than 10 mol %, adhesiveness to the film layer may be insufficient, while if it is more than 35 mol %, adhesiveness to the rubber may be insufficient. In contrast, if the degree of epoxidation of the epoxidized natural rubber B is within the more preferable range, this is advantageous in terms of balancing adhesiveness to the film layer and adhesiveness to the rubber layer.

The content of the epoxidized natural rubber B in the epoxidized natural rubber may be selected appropriately depending on the intended use without any particular limitation, and is preferably 20 mass % to 90 mass %, more preferably 60 mass % to 85 mass %, and particularly preferably 70 mass % to 80 mass %.

If the content of the epoxidized natural rubber B in the epoxidized natural rubber is less than 20 mass %, adhesiveness to the film layer may be insufficient, while if the content is more than 90 mass %, adhesiveness to the rubber may be insufficient. In contrast, if the content of the epoxidized natural rubber B in the epoxidized natural rubber is within the particularly preferable range, this is advantageous in terms of balancing adhesiveness to the film layer and adhesiveness to the rubber layer.

—Average Degree of Epoxidation of Epoxidized Natural Rubber—

The average degree of epoxidation of the epoxidized natural rubber may be selected appropriately depending on the intended use without any particular limitation, and is preferably 15 mol % to 70 mol %, more preferably 20 mol % to 60 mol %, and particularly preferably 25 mol % to 50 mol %.

If the average degree of epoxidation of the epoxidized natural rubber is less than 15 mol %, adhesiveness to the film layer may be insufficient, while if the average degree of epoxidation is more than 70 mol %, adhesiveness to the rubber layer may be insufficient. In contrast, if the degree of epoxidation of the epoxidized natural rubber B is within the particularly preferable range, this is advantageous in terms of balancing adhesiveness to the film layer and adhesiveness to the rubber layer.

Additionally, the average degree of epoxidation represents a number-average degree of epoxidation of the epoxidized natural rubber A and the epoxidized natural rubber B, and may be calculated, for example, using nuclear magnetic resonance (NMR) (JNM-ECA series available from JEOL Ltd.) spectroscopy, and so forth.

<Crosslinking Agent>

The aforementioned crosslinking agent may be selected appropriately depending on the intended use without any particular limitation, and examples thereof include sulfur, zinc oxide, and p,p'-dibenzoylquinonedioxime. These examples may be used alone or in combination of two or more.

Among these, preferred is sulfur in terms of better strength and fatigue resistance of the resulting adhesion layer.

The content of the crosslinking agent is not particularly limited and may be selected appropriately depending on the intended use. The preferred content thereof is 0.5 parts by mass to 1.5 parts by mass per 100 parts by mass of the aforementioned rubber component.

If the content of the crosslinking agent is less than 0.5 parts by mass, the strength of the adhesion layer after crosslinking may be insufficient, while if the content is more than 1.5 parts by mass, blooming of the crosslinking agent may occur, reducing the tackiness of the resulting rubber.

<Crosslinking Promoter>

The aforementioned crosslinking promoter may be selected appropriately depending on the intended use without any particular limitation, and examples thereof include N,N'-dicyclohexyl-2-benzothiazolylsulfenamide, diphenylguanidine, dibenzothiazyl disulfide, N-t-butyl-2-benzothiazylsulphenamide, hexamethylenetetramine, N,N'-diphenylthiourea, trimethylthiourea, N,N'-diethylthiourea, 1,3-diphenylguanidine, 2-mercaptobenzothiazole, and N-cyclohexyl-2-benzothiazolylsulfenamide. These examples may be used alone or in combination of two or more.

Among these, preferred is N-cyclohexyl-2-benzothiazolylsulfenamide in terms of balancing adhesiveness to the film layer and adhesiveness to the rubber.

The content of the crosslinking promoter is preferably more than 0 parts by mass and not more than 2 parts by mass per 100 parts by mass of the aforementioned rubber component.

If the content of the crosslinking promoter is more than 2 parts by mass, adhesiveness to the film layer may be reduced.

<Other Components>

The aforementioned other components may be selected appropriately depending on the intended use without any particular limitation, and examples thereof include carbon black, stearic acid, zinc oxide, a tackifying resin, and an age resister. These examples may be used alone or in combination of two or more.

—Tackifying Resin—

The aforementioned tackifying resin may be selected appropriately depending on the intended use without any particular limitation, and examples thereof include a rosin-based resin, a terpene-based resin, and a phenol-based resin. These examples may be used alone or in combination of two or more.

—Age Resister—

The aforementioned age resister may be selected appropriately depending on the intended use without any particular limitation, and examples thereof include N-(1,3-dimethylbutyl)-N'-phenyl-p-phenylenediamine(N-phenyl-N'-(1,3-dimethylbutyl)-p-phenylenediamine), 6-ethoxy-1,2-dihydro-2,2,4-trimethyl quinoline, N-phenyl-1-naphthylamine, alkylated diphenylamine, octylated diphenylamine and a refined product of a polymeric material of 2,2,4-trimethyl-1,2-dihydroquinoline. These examples may be used alone or in combination of two or more.

(Adhesion Method)

An adhesion method according to the present invention may comprise at least a disposition step and a vulcanization step, as well as other optional steps.

<Disposition Step>

The aforementioned disposition step is a step of disposing the adhesive composition of the present invention between the film layer and the unvulcanized rubber layer.

In this case, the adhesive composition may also be formed into a sheet before being disposed between the film layer and the unvulcanized rubber layer.

—Film Layer—

The shape, structure and size of the aforementioned film layer may be selected appropriately depending on the intended use without any particular limitation.

The thickness of the film layer is preferably 200 μm or less, although it may also be selected appropriately depending on the intended use without any particular limitation.

The film layer having a thickness of more than 200 μm may result in poor fatigue durability.

The material of the film layer may be selected appropriately depending on the intended use without any particular limitation, and examples thereof include a polyamide-based polymer, an ethylene-vinyl alcohol-based copolymer, a urethane-based polymer, an olefin-based polymer, and a diene-based polymer. These examples may be used alone or in combination of two or more.

Among these, preferred is an ethylene-vinyl alcohol-based copolymer in terms of air retention (air permeability).

—Unvulcanized Rubber Layer—

The shape, structure and size of the aforementioned unvulcanized rubber layer may be selected appropriately depending on the intended use without any particular limitation.

The thickness of the unvulcanized rubber layer is preferably in the range of 200 µm to 5000 µm, although it may also be selected appropriately depending on the intended use without any particular limitation.

The unvulcanized rubber layer having a thickness of less than 200 µm may result in poor operability during the disposition step, while the unvulcanized rubber layer having a thickness of more than 5000 µm may lead to poor fatigue durability.

The material of the unvulcanized rubber layer may be selected appropriately depending on the intended use without any particular limitation, and examples thereof include natural rubber, emulsion-polymerized styrene butadiene rubber, solution-polymerized styrene butadiene rubber, high cis-butadiene rubber, low cis-butadiene rubber, isoprene rubber, acrylonitrile-butadiene rubber, hydrogenated nitrile rubber, butyl rubber, halogenated butyl rubber, and chloroprene rubber. These examples may be used alone or in combination of two or more.

Among these, preferred is natural rubber in terms of co-crosslinkability with the adhesion layer, fatigue resistance and tackiness.

In addition, the unvulcanized rubber layer may be blended as appropriate with carbon black, sulfur, a vulcanization accelerator, an age resister, an additive such as aromatic oil.

—Disposition—

The way of performing the aforementioned disposition may be selected appropriately depending on the intended use without any particular limitation, and examples thereof include application to the film layer or the unvulcanized rubber layer. While the way of performing the application may be selected appropriately depending on the intended use without any particular limitation, an application liquid that is formed by dissolving the adhesive composition of the present invention in a good solvent is preferably used.

The solid concentration of the application liquid is preferably in the range of 10 mass % to 40 mass %, although it may be selected appropriately depending on the intended use without any particular limitation.

The application liquid having a solid concentration of less than 10 mass % may result in poor application operability due to an excessively low viscosity of the application liquid, while the application liquid having a solid concentration of more than 40 mass % may lead to poor application operability due to an excessively high viscosity of the application liquid.

—Good Solvent—

The aforementioned good solvent may be selected appropriately depending on the intended use without any particular limitation, and examples thereof include toluene, cyclohexane, and tetrahydrofuran (THF).

<Vulcanization Step>

The aforementioned vulcanization step is a step of vulcanizing the film layer and the unvulcanized rubber layer.

—Vulcanization—

While the way of performing the aforementioned vulcanization may be selected appropriately depending on the intended use without any particular limitation, the vulcanization is preferably performed at temperatures of 120° C. to 180° C. for 0.1 hour to 0.8 hour.

If the temperature is lower than 120° C., adhesiveness to the rubber may be insufficient, while if it is higher than 180° C., adhesiveness to the film layer may be reduced.

<Other Steps>

The aforementioned other steps may be selected appropriately depending on the intended use without any particular limitation, and examples thereof include a thermal compression step.

(Laminate)

A laminate according to the present invention may be selected appropriately depending on the intended use without any particular limitation, as long as members constituting the laminate are adhered to each other by the adhesion method according to the present invention, and examples thereof include a laminate having a three-layered structure formed by a resin film layer (film layer), an adhesive layer, and a carcass cord layer (rubber layer).

(Tire)

A tire according to the present invention is preferably a pneumatic tire, although it may be selected appropriately depending on the intended use without any particular limitation, as long as it has the laminate according to the present invention. The tire may be manufactured by a conventional method. For example, when the film layer is used as the inner liner of a pneumatic tire, a thermoplastic resin composition is extruded in advance into a film having a predetermined width and thickness. Then, the adhesive composition is applied onto the film and subsequently the film applied with the adhesive composition is attached to a tire molding drum in a cylindrical form so that a surface of the film to which the adhesive composition has not been applied faces the drum side (down). Successively laminated thereon are a carcass layer, a belt layer, a tread layer, which are composed of unvulcanized rubber, and other members used for the production of usual tires, after which the drum is withdrawn to obtain a green tire. Then, the green tire is heated and vulcanized in accordance with a conventional method to thereby manufacture a desired pneumatic tire.

EXAMPLES

The present invention will now be specifically described below with reference to examples thereof in a non-limiting way.

Comparative Example 1

<Adhesion>

A composition formulated as shown in Comparative Example 1 of Table 1 was kneaded at 60° C. to 100° C. for 5 minutes using a kneader (trade name: Plastomill, manufacturer: Toyo Seiki Seisaku-sho, Ltd.) to obtain an adhesive composition.

Added to the obtained adhesive composition was toluene (trade name: special grade toluene, manufacturer: Kanto Chemical Co., Inc.) as a good solvent to prepare an application liquid having a solid concentration of 15 mass %.

A resin film layer (film layer) composed of ethylene vinyl alcohol to which the prepared application liquid had been applied was adhered to a carcass cord layer (rubber layer) composed of natural rubber, and the adhered product was vulcanized at a temperature of 160° C. for 20 minutes.

It should be noted that the resin film layer (film layer) was prepared in the following manner.

<<Method of Manufacturing the Film Layer>>

Ethylene-vinyl alcohol copolymer pellets (synthesized by the method disclosed in paragraph [0040] of WO2006/059621 as described below) were used to form a film using a film forming device composed of a 40 mmφ extruder (PLABOR GT-40-A manufactured by Research Laboratory of Plastics Technology Co., Ltd.) and a T-die under the following extrusion conditions to obtain a single-layer film of 20 μm thick.

Type: single-screw extruder (non-bent type)
L/D: 24
Bore: 40 mm φ
Screw: single full flight type, surface nitrided steel
Screw speed: 40 rpm
Die: 550 mm wide, coat hanger die
Lip gap: 0.3 mm
Cylinder and die temperature setting: C1/C2/C3/Adaptor/Die=180/200/210/210/210 (° C.)

<<<Method of Synthesizing Ethylene-Vinyl Alcohol Copolymer Pellets>>>

In this case, 2 parts by mass of an ethylene-vinyl alcohol copolymer having an ethylene content of 44 mol % and a degree of saponification of 99.9 mol % (MFR: 5.5 g/10 min (at 190° C. under load of 21.18 N)) and 8 parts by mass of N-methyl-2-pyrrolidone were fed to a pressure reactor vessel, which in turn was heated at 120° C. for 2 hours under stirring to thereby completely dissolve the ethylene-vinyl alcohol copolymer. Then, as an epoxy compound, 0.4 parts by mass of epoxypropane was added thereto, which was heated at 160° C. for 4 hours. Upon completion of the heating, the resulting product was precipitated in 100 parts by mass of distilled water and the precipitate was washed thoroughly with a large amount of distilled water to remove therefrom N-methyl-2-pyrrolidone and unreacted epoxypropane, whereby a modified ethylene-vinyl alcohol copolymer was obtained. Further, the modified ethylene-vinyl alcohol copolymer thus obtained was ground to a particle size of about 2 mm using a grinder and again washed thoroughly with a large amount of distilled water. The washed particles were vacuum dried for 8 hours at room temperature and then melt at 200° C. using a twin screw extruder for pelletization.

<Adhesiveness Measurement>

Adhesiveness between a resin film layer (film layer) and a carcass cord layer (rubber layer) was measured using a tensile testing machine (trade name: Strograph VE5D, manufacturer: Toyo Seiki Co., Ltd.) where a 10 mm-wide test specimen was peeled at an angle of 180°. The measurement results are shown in Table 1.

<Air Permeability Measurement>

Air permeability (gas permeability) of the adhesive layer formed by the aforementioned adhesive composition was measured using MOCON OX-TRAN2/20 manufactured by Modern Controls Inc., under the conditions of 20° C., 65% RH, according to the method specified in JIS K7126 (isopiestic method). The measurement results are shown in Table 1. In Table 1, smaller values of air permeability indicate better results.

Comparative Example 2

Adhesion and measurements of adhesiveness and air permeability were performed in the same manner as described in Comparative Example 1, except for the formulation as shown in Comparative Example 2 of Table 1 in place of that of Comparative Example 1 of Table 1. The measurement results are shown in Table 1.

Example 1

Adhesion and measurements of adhesiveness and air permeability were performed in the same manner as described in Comparative Example 1, except for the formulation as shown in Example 1 of Table 1 in place of that in Comparative Example 1 of Table 1. The measurement results are shown in Table 1.

Example 2

Adhesion and measurements of adhesiveness and air permeability were performed in the same manner as described in Comparative Example 1, except for the formulation as shown in Example 2 of Table 1 in place of that of Comparative Example 1 of Table 1. The measurement results are shown in Table 1.

Example 3

Adhesion and measurements of adhesiveness and air permeability were performed in the same manner as described in Comparative Example 1, except for the formulation as shown in Example 3 of Table 1 in place of that of Comparative Example 1 of Table 1. The measurement results are shown in Table 1.

Example 4

Adhesion and measurements of adhesiveness and air permeability were performed in the same manner as described in Comparative Example 1, except for the formulation as shown in Example 4 of Table 1 in place of that of Comparative Example 1 of Table 1. The measurement results are shown in Table 1.

Comparative Example 3

Adhesion and measurements of adhesiveness and air permeability were performed in the same manner as described in Comparative Example 1, except for the formulation as shown in Comparative Example 3 of Table 2 in place of that of Comparative Example 1 of Table 1. The measurement results are shown in Table 2.

Comparative Example 4

Adhesion and measurements of adhesiveness and air permeability were performed in the same manner as described in Comparative Example 1, except for the formulation as shown in Comparative Example 4 of Table 2 in place of that of Comparative Example 1 of Table 1. The measurement results are shown in Table 2.

Example 5

Adhesion and measurements of adhesiveness and air permeability were performed in the same manner as described in Comparative Example 1, except for the formulation as shown in Example 5 of Table 2 in place of that of Comparative Example 1 of Table 1. The measurement results are shown in Table 2.

Example 6

Adhesion and measurements of adhesiveness and air permeability were performed in the same manner as described in Comparative Example 1, except for the formulation as shown in Example 6 of Table 2 in place of that of Comparative Example 1 of Table 1. The measurement results are shown in Table 2.

Example 7

Adhesion and measurements of adhesiveness and air permeability were performed in the same manner as described in Comparative Example 1, except for the formulation as shown in Example 7 of Table 2 in place of that of Comparative Example 1 of Table 1. The measurement results are shown in Table 2.

Example 8

Adhesion and measurements of adhesiveness and air permeability were performed in the same manner as described in Comparative Example 1, except for the formulation as shown in Example 8 of Table 3 in place of that of Comparative Example 1 of Table 1. The measurement results are shown in Table 3.

Example 9

Adhesion and measurements of adhesiveness and air permeability were performed in the same manner as described in Comparative Example 1, except for the formulation as shown in Example 9 of Table 3 in place of that of Comparative Example 1 of Table 1. The measurement results are shown in Table 3.

Example 10

Adhesion and measurements of adhesiveness and air permeability were performed in the same manner as described in Comparative Example 1, except for the formulation as shown in Example 10 of Table 3 in place of that of Comparative Example 1 of Table 1. The measurement results are shown in Table 3.

Comparative Example 5

Adhesion and measurements of adhesiveness and air permeability were performed in the same manner as described in Comparative Example 1, except for the formulation as shown in Comparative Example 5 of Table 3 in place of that of Comparative Example 1 of Table 1. The measurement results are shown in Table 3.

Comparative Example 6

Adhesion and measurements of adhesiveness and air permeability were performed in the same manner as described in Comparative Example 1, except for the formulation as shown in Comparative Example 6 of Table 3 in place of that of Comparative Example 1 of Table 1. The measurement results are shown in Table 3.

TABLE 1

| | Comp. Ex. 1 | Comp. Ex. 2 | Ex. 1 | Ex. 2 | Ex. 3 | Ex. 4 |
|---|---|---|---|---|---|---|
| ENR25*[1] | 70 | — | 80 | — | 90 | 20 |
| ENR50*[2] | — | 70 | — | 80 | 10 | 80 |
| ENR10*[3] | — | — | — | — | — | — |
| ENR60*[4] | — | — | — | — | — | — |
| Natural Rubber (NR)*[5] | 30 | 30 | 20 | 20 | — | — |
| Carbon Black (C/B)*[6] | 30 | 30 | 30 | 30 | 30 | 30 |
| Stearic Acid | 1 | 1 | 1 | 1 | 1 | 1 |
| Zinc Oxide | 3 | 3 | 3 | 3 | 3 | 3 |
| Tackifying Resin*[7] | 10 | 10 | 10 | 10 | 10 | 10 |
| Age Resister*[8] | 1 | 1 | 1 | 1 | 1 | 1 |
| Crosslinking Promoter*[9] | 1.5 | 1.5 | 1.5 | 1.5 | 1.5 | 1.5 |
| Sulfur (Crosslinking Agent) | 1.05 | 1.05 | 1.05 | 1.05 | 1.05 | 1.05 |
| Air Retention ($\times 10^{-10}$ ml·cm/cm$^2$·sec·cmHg) | 16 | 10 | 14 | 6.7 | 11.8 | 5.8 |
| Adhesiveness (N/25 mm) | 20 | 25 | 45 | 50 | ≥70 | ≥75 |
| Fracture Pattern | Interfacial Peeling | Interfacial Peeling | Interfacial Peeling | Interfacial Peeling | Base Material Fracture*[10] | Base Material Fracture*[10] |

TABLE 2

| | Comp. Ex. 3 | Comp. Ex. 4 | Ex. 5 | Ex. 6 | Ex. 7 |
|---|---|---|---|---|---|
| ENR25*[1] | — | — | — | — | — |
| ENR50*[2] | — | — | — | — | — |
| ENR10*[3] | 70 | — | 80 | — | 20 |
| ENR60*[4] | — | 70 | — | 80 | 80 |
| Natural Rubber (NR)*[5] | 30 | 30 | 20 | 20 | — |
| Carbon Black (C/B)*[6] | 30 | 30 | 30 | 30 | 30 |
| Stearic Acid | 1 | 1 | 1 | 1 | 1 |
| Zinc Oxide | 3 | 3 | 3 | 3 | 3 |
| Tackifying Resin*[7] | 10 | 10 | 10 | 10 | 10 |
| Age Resister*[8] | 1 | 1 | 1 | 1 | 1 |

TABLE 2-continued

|  | Comp. Ex. 3 | Comp. Ex. 4 | Ex. 5 | Ex. 6 | Ex. 7 |
|---|---|---|---|---|---|
| Crosslinking Promoter*9 | 1.5 | 1.5 | 1.5 | 1.5 | 1.5 |
| Sulfur (Crosslinking Agent) | 1.05 | 1.05 | 1.05 | 1.05 | 1.05 |
| Air Retention ($\times 10^{-10}$ ml·cm/cm²·sec·cmHg) | 20 | 9 | 19 | 6 | 4.8 |
| Adhesiveness (N/25 mm) | 10 | 30 | 45 | 55 | ≥75 |
| Fracture Pattern | Interfacial Peeling | Interfacial Peeling | Interfacial Peeling | Interfacial Peeling | Base Material Fracture*10 |

TABLE 3

|  | Ex. 8 | Comp. Ex. 5 | Comp. Ex. 6 | Ex. 9 | Ex. 10 |
|---|---|---|---|---|---|
| ENR25*1 | — | 30 | — | 40 | — |
| ENR50*2 | — | 30 | — | 40 | — |
| ENR10*3 | 90 | — | 30 | — | 40 |
| ENR60*4 | 10 | — | 30 | — | 40 |
| Natural Rubber (NR)*5 | — | 40 | 40 | 20 | 20 |
| Carbon Black (C/B)*6 | 30 | 30 | 30 | 30 | 30 |
| Stearic Acid | 1 | 1 | 1 | 1 | 1 |
| Zinc Oxide | 3 | 3 | 3 | 3 | 3 |
| Tackifying Resin*7 | 10 | 10 | 10 | 10 | 10 |
| Age Resister*8 | 1 | 1 | 1 | 1 | 1 |
| Crosslinking Promoter*9 | 1.5 | 1.5 | 1.5 | 1.5 | 1.5 |
| Sulfur (Crosslinking Agent) | 1.05 | 1.05 | 1.05 | 1.05 | 1.05 |
| Air Retention ($\times 10^{-10}$ ml·cm/cm²·sec·cmHg) | 16 | 14 | 15 | 11.8 | 12.2 |
| Adhesiveness (N/25 mm) | ≥70 | 15 | 15 | 60 | 60 |
| Fracture Pattern | Base Material Fracture*10 | Interfacial Peeling | Interfacial Peeling | Interfacial Peeling | Interfacial Peeling |

Notes)
*1ENR25: epoxidized natural rubber (trade name: ENR25, manufacturer: RRIM, degree of epoxidation (epoxidation rate): 25%)
*2ENR50: epoxidized natural rubber (trade name: ENR50, manufacturer: RRIM, degree of epoxidation (epoxidation rate): 50%)
*3ENR10: epoxidized natural rubber (trade name: ENR-10, manufacturer: Kumpulan Guthrie Berhad, degree of epoxidation (epoxidation rate): 10%)
*4ENR60: epoxidized natural rubber (trade name: ENR-60, manufactured by Muang Mai Guthrie, degree of epoxidation (epoxidation rate): 60%)
*5natural rubber (trade name: BC2X, manufacturer: Thai Natural Rubber)
*6HAF carbon (trade name: SEAST NB, manufacturer: Tokai Carbon Co., Ltd.)
*7butylphenol acetylene resin (trade name: Koresin, manufacturer: BASF Aktiengesellschaft)
*8N-phenyl-N'-(1,3-dimethylbutyl)-p-phenylenediamine (trade name: Antigen 6C, manufacturer: Sumitomo Chemical Co., Ltd.)
*9N-cyclohexyl-2-benzothiazolesulfenamide (trade name: NOCCELER CZ-G, manufacturer: Ouchi Shinko Chemical Industrial Co., Ltd.)
*10"Base Material Fracture" in Examples 3, 4, 7, 8 indicates the occurrence of fracture of rubber as the base material without interfacial peeling due to sufficiently high adhesiveness.

It can be seen from Tables 1 to 3 that the adhesive compositions of Examples 1 to 10 where at least 80 mass % of the rubber component is an epoxidized natural rubber may improve adhesiveness more than the adhesive compositions of Comparative Examples 1 to 6 where less than 80 mass % of the rubber component is an epoxidized natural rubber.

REFERENCE SIGNS LIST

10 Resin film layer (film layer)
11 Adhesive layer
12 Butyl inner layer (rubber layer)
13 Squeegee layer
14 Carcass cord layer (rubber layer)
20 Resin film layer (film layer)
21 Adhesive layer
22 Carcass cord layer (rubber layer)

The invention claimed is:

1. An adhesive composition comprising a rubber component, at least 80 mass % of which rubber component is an epoxidized natural rubber,
wherein the epoxidized natural rubber contains at least an epoxidized natural rubber A and an epoxidized natural rubber B,
wherein the epoxidized natural rubber A has a higher degree of epoxidation than that of the epoxidized natural rubber B, and
wherein the epoxidized natural rubber A is contained in the epoxidized natural rubber by 15 mass % to 40 mass %.

2. The adhesive composition according to claim 1, wherein the epoxidized natural rubber A has a degree of epoxidation of 40 mol % to 80 mol % and the epoxidized natural rubber B has a degree of epoxidation of 10 mol % to 35 mol %.

3. The adhesive composition according to claim 1, wherein the epoxidized natural rubber has an average degree of epoxidation of 15 mol % to 70 mol %.

4. The adhesive composition according to claim 1 further comprising a crosslinking agent.

5. The adhesive composition according to claim 1 further comprising a crosslinking promoter.

6. An adhesion method for adhering a film layer to an unvulcanized rubber layer, comprising: disposing the adhesive composition according to claim 1 between a film layer and an unvulcanized rubber layer; and vulcanizing the film layer and the unvulcanized rubber layer.

7. The adhesion method according to claim 6, wherein an application liquid formed by dissolving the adhesive composition in a good solvent is applied to the film layer or the unvulcanized rubber layer.

8. The adhesion method according to claim 6, wherein the adhesive composition is formed into a sheet before being disposed between the film layer and the unvulcanized rubber layer.

9. A laminate formed by a film layer and an unvulcanized rubber layer adhered to each other by the adhesion method according to claim 6.

10. A tire comprising the laminate according to claim 9.

11. The adhesive composition according to claim 1, wherein the epoxidized natural rubber B is contained in the epoxidized natural rubber by 60 mass % to 85 mass %.

* * * * *